(12) United States Patent
Ambrosino et al.

(10) Patent No.: US 10,031,896 B2
(45) Date of Patent: Jul. 24, 2018

(54) AUTHORING, DEPLOYING AND USING INTERACTIVE, DATA-DRIVEN TWO OR MORE DIMENSIONAL CONTENT

(71) Applicant: Bridgeborn, Inc., Virginia Beach, VA (US)

(72) Inventors: Timothy J. Ambrosino, Virginia Beach, VA (US); Kevin M. Curry, Virginia Beach, VA (US); Ted E. Ingalsbe, Virginia Beach, VA (US); Robert G. Johns, Virginia Beach, VA (US); Michael C. Brazell, San Antonio, TX (US)

(73) Assignee: BRIDGEBORN, INC., Virginia Beach, VA (US)

( * ) Notice: Subject to any disclaimer, the term of this patent is extended or adjusted under 35 U.S.C. 154(b) by 798 days.

(21) Appl. No.: 14/202,368

(22) Filed: Mar. 10, 2014

(65) Prior Publication Data
US 2014/0201610 A1 Jul. 17, 2014

Related U.S. Application Data

(63) Continuation of application No. 12/352,339, filed on Jan. 12, 2009, now Pat. No. 8,671,338, which is a
(Continued)

(51) Int. Cl.
*G06F 17/20* (2006.01)
*G06F 17/22* (2006.01)
(Continued)

(52) U.S. Cl.
CPC ........ *G06F 17/2247* (2013.01); *G06F 17/272* (2013.01); *G06F 17/30899* (2013.01)

(58) Field of Classification Search
CPC .............. G06F 17/2247; G06F 17/272; G06F 17/30899
See application file for complete search history.

(56) References Cited

U.S. PATENT DOCUMENTS 5,838,906 A 11/1998 Doyle et al.
5,999,944 A 12/1999 Lipkin
(Continued)

OTHER PUBLICATIONS

Don Brutzman, "Teaching 3D Modeling and Simulation: Virtual Kelp Forest Case Study", Feb. 2002, ACM1-58113-468-01/02/0002, pp. 9.*
(Continued)

*Primary Examiner* — Chau T Nguyen
(74) *Attorney, Agent, or Firm* — James J. DeCarlo; Greenberg Traurig, LLP

(57) ABSTRACT

A method whereby dynamic, interactive, two or more dimensional media can be assembled and delivered where the need for pre-packaged binary content files and pre-compiled content is eliminated by using a markup language, a standard URI to identify local and/or remote media resources within a markup text, a standard protocol to retrieve the resource, a parser to load resources from the native format and a markup language to define behavior and where dynamic, interactive, n-dimensional media is achieved by using a markup language, connecting or embedding content into a local or remote data source, dragging-and-dropping markup text into a content provider application, updating content using a form, establishing a two-way connection between content and one or more data sources such that changing to the data source(s) and seeing the results propagate to the scene changing the content and seeing the results propagate to the data source(s) and using a markup language to issue commands, configure interaction, and create behavior.

20 Claims, 9 Drawing Sheets

Related U.S. Application Data continuation of application No. 10/993,151, filed on Nov. 22, 2004, now Pat. No. 7,681,114.

(60) Provisional application No. 60/523,668, filed on Nov. 21, 2003.

(51) Int. Cl.
*G06F 17/30* (2006.01)
*G06F 17/27* (2006.01)

(56) References Cited

U.S. PATENT DOCUMENTS

| | | | |
|---|---|---|---|
| 6,331,858 B2 | 12/2001 | Fisher | |
| 6,348,927 B1 | 2/2002 | Lipkin | |
| 6,362,817 B1* | 3/2002 | Powers | G06T 17/00 345/419 |
| 6,363,404 B1* | 3/2002 | Dalal | G06F 17/30905 345/582 |
| 6,370,537 B1 | 4/2002 | Gilbert et al. | |
| 6,373,484 B1 | 4/2002 | Orell et al. | |
| 6,400,366 B1 | 6/2002 | Davies et al. | |
| 6,493,001 B1 | 12/2002 | Takagi et al. | |
| 6,552,721 B1 | 4/2003 | Ishikawa | |
| 6,567,819 B1 | 5/2003 | Cheng et al. | |
| 6,671,853 B1 | 12/2003 | Burkett et al. | |
| 6,731,314 B1 | 5/2004 | Cheng et al. | |
| 6,879,946 B2 | 4/2005 | Rong et al. | |
| 6,898,604 B1 | 5/2005 | Ballinger et al. | |
| 6,918,107 B2 | 7/2005 | Lucas et al. | |
| 6,947,037 B1 | 9/2005 | Lynn et al. | |
| 6,950,791 B1* | 9/2005 | Bray | G06F 17/30241 345/420 |
| 6,990,654 B2 | 1/2006 | Carroll, Jr. | |
| 7,017,143 B1 | 3/2006 | Andrew et al. | |
| 7,064,760 B2 | 6/2006 | Capin et al. | |
| 7,075,531 B1* | 7/2006 | Ando | G06T 13/80 345/420 |
| 7,197,512 B2 | 3/2007 | Pharies et al. | |
| 7,207,002 B2 | 4/2007 | Mireku | |
| 7,246,358 B2 | 7/2007 | Chinnici et al. | |
| 7,277,928 B2 | 10/2007 | Lennon | |
| 7,325,226 B2 | 1/2008 | Pepin et al. | |
| 7,425,950 B2 | 9/2008 | Ito et al. | |
| 7,689,901 B2 | 3/2010 | Rising, III et al. | |
| 7,865,394 B1* | 1/2011 | Calloway | G06Q 10/107 370/252 |
| 2001/0027456 A1 | 10/2001 | Lancaster et al. | |
| 2001/0042078 A1* | 11/2001 | Anwar | G06F 3/1206 715/255 |
| 2001/0055039 A1* | 12/2001 | Matsuda | G06F 17/30994 715/848 |
| 2002/0124236 A1 | 9/2002 | Ruths et al. | |
| 2002/0184303 A1 | 12/2002 | Uner | |
| 2004/0014013 A1 | 1/2004 | Diesel et al. | |
| 2004/0100489 A1* | 5/2004 | Berestov | G06F 17/30905 715/738 |
| 2005/0033719 A1* | 2/2005 | Tirpak | G06F 17/30557 |
| 2005/0035970 A1 | 2/2005 | Wirtschafter et al. | |
| 2005/0065951 A1* | 3/2005 | Liston | G06F 17/50 |

OTHER PUBLICATIONS

Don Brutzman, "The Virtual Reality Modeling Language and Java", Jun. 1998, Communications of the ACM, vol. 41 No. 6, pp. 10.*

Signès et al., "MPEG-4's Binary Format for Scene Description," Signal Processing: Image Communication, 15:321-345(2000).

Walczak et al. "X-VRML—XML Based Modeling of Virtual Reality," Proceedings of the Symposium on Applications and the Internet (SAINT'02), (2002).

"Information technology—Computer graphics and image processing—The Virtual Reality Modeling Language (VRML)—Part 1: Functional specification and UTF-8 encoding." American National Standards Institute, Reference No. ISO/IEC 14772-1:1997(E).

Pai et al., "Scanning Physical Interaction Behavior of 3D Objects", 2001, Department of Computer Science, University of British Columbia, Vancouver, Canada, pp. 1-10.

* cited by examiner

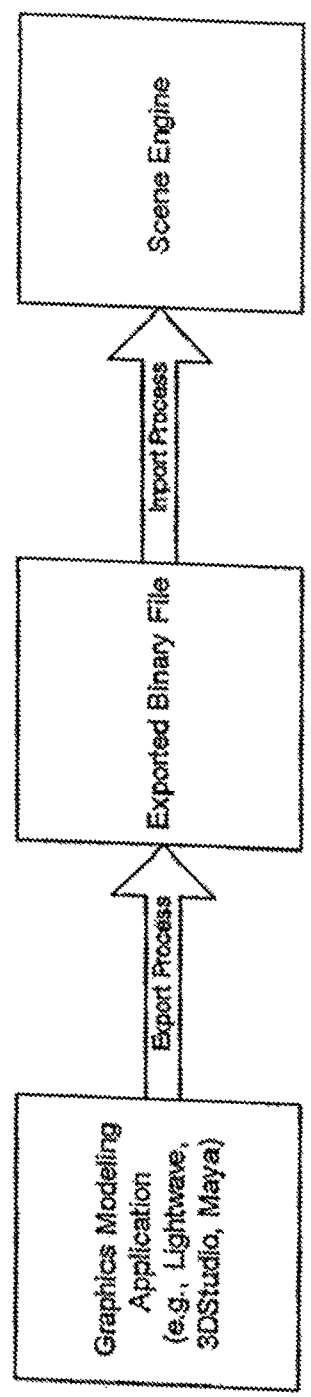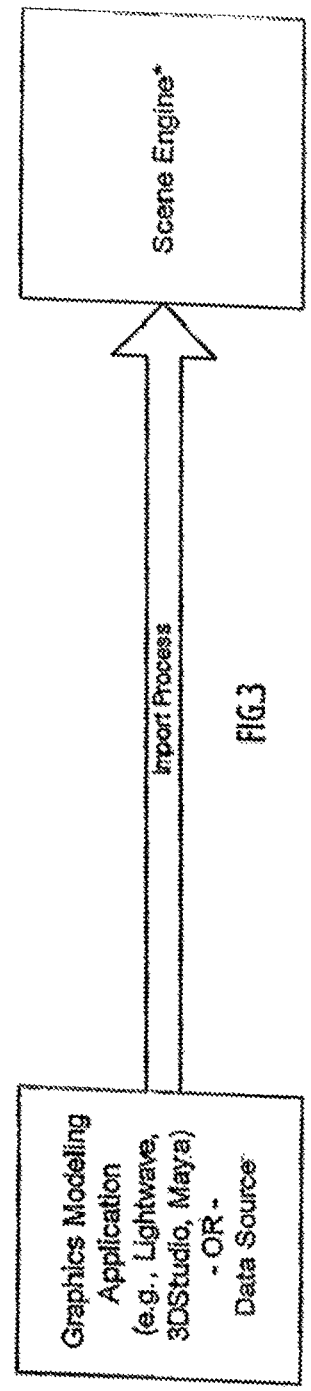

AUTHORING, DEPLOYING AND USING INTERACTIVE, DATA-DRIVEN TWO OR MORE DIMENSIONAL CONTENT

CROSS REFERENCE TO RELATED PATENT APPLICATION

This application is a continuation of U.S. patent application Ser. No. 12/352,339, filed Jan. 12, 2009, which is a continuation of U.S. patent application Ser. No. 10/993,151, filed Nov. 22, 2004 which claims priority from prior Provisional Patent Application Ser. No. 60/523,688 filed Nov. 21, 2003, the entire disclosure of each is incorporated herein by reference.

BACKGROUND OF THE INVENTION

Field of the Invention

The present invention relates to the authoring, delivery and use of interactive two or more dimensional multimedia and, particularly, three dimensional content.

Discussion of the Prior Art

It is common in the authoring art to bundle multiple media resources, and sometimes compiled script, into a single binary package. The binary package is then read and/or interpreted by software to create a graphical display and, in cases where script is included, provide interactivity and behavior.

One technology using pre-packaged media resources is the Viewpoint MTS file, which "carries binary information for VET content." The Viewpoint MTS file is a single file containing one or more models, textures, sounds, and the like. An MTS is repeatedly referred to as a "Media Carrier File," meaning that it is a file used to contain other files. By way of example, where an n-dimensional scene uses one LightWave™ model (.lwo file) and one Bitmap texture (.bmp file), Viewpoint Experience Technology bundles the .lwo and .bmp into a single MTS file before it is loaded into the scene.

Technologies that bundle scene content and compiled script using a scene compiler include Director3D™ by Macromedia and Walkabout Developer's Kit by Mayim Visual Solutions while Wild Tangent provides a third solution with a toolkit using a Java API and JavaScript where Java must also be compiled. As show in FIG. 1, these products require an intermediate step labeled as "Exported Binary File" in order to provide import data to a scene engine. More particularly, these products depend on logic built through proprietary scripting languages to provide content, interaction, and behavior. The code written in these scripting languages is then processed and packaged, along with media content, by a proprietary compiler. The prior art technologies are also shown in FIG. 2 where multiple sources are shown.

SUMMARY OF THE INVENTION

One aspect of the present invention involves a method of assembling and delivering dynamic, interactive, two or more dimensional media including the steps of generating a markup language document defining an interactive, two or more dimensional scene without using pre-packaged binary content files or pre-compiled content, deserializing the markup language document into objects and instructions and displaying results from the deserialized markup language document.

Some of the advantages of the present invention over the prior art are elimination of the need to pre-package and pre-compile two or more dimensional multimedia is eliminated, two or more dimensional multimedia is derived from at least one data source such that changes in the data source(s) are reflected in changes to the media without compilation, the use of two or more dimensional multimedia to affect changes at least one data source, whereby user interaction with the media results in changes to the data source, an interactive, graphical display is provided from uncompiled, two or more dimensional multimedia and at least one data source and provides 3D interaction techniques such as, for example, using a mouse to push down the scale of a column in order to update a field in a database.

Other advantages, aspects, features and characteristics of the present invention will become apparent from the following description of the preferred embodiments taken in conjunction with the accompanying drawings, wherein like parts in each of the several figures are identified by the same reference characters.

BRIEF DESCRIPTION OF THE DRAWINGS

FIGS. 1 and 2 are simplified diagrams of prior art technologies showing single and multiple sources, respectively.

FIGS. 3 and 4 are simplified diagrams showing single and multiple sources, respectively, operating with a scene engine according to the present invention.

DESCRIPTION OF THE PREFERRED EMBODIMENTS

In describing the present invention, interaction can be either or both through direct manipulation of content (e.g., click-on-and-drag-to-move) or through indirect manipulation (e.g., enter a number into a form) and interactive content is minimally defined by its ability to support direct manipulation. Direct manipulation is defined by the ability for a human user to place a physical or virtual implement in three-dimensional space and use that implement to control one or more of position, rotation, scale, and magnification, and/or a number of other attributes of a graphics artifact including model level down to geometric primitive of a model. As used herein an XML document, or markup language document, is XML recognized by the W3C as conforming to the rules of XML. As such, a document can be a single XML node (tag) or a tree of many nodes. A document can exist as a file or as a text stream. A scene engine includes any software component used to facilitate the display and interaction capabilities of an interactive, multidimensional scene. Objects are instances of data structures, including sets of behaviors that are applicable to the data structures. Instructions are a code that specifies a process to be executed or action to be performed. Data Sources are any information stored in a machine-readable format that can be used by the invention. Sources include data bases, text documents, image repositories. The terms URI (Uniform Resource Identifier) and URL (Uniform Resource Locator) are used interchangeably herein with the understanding that URL is a subset of URI.

Figure 2:
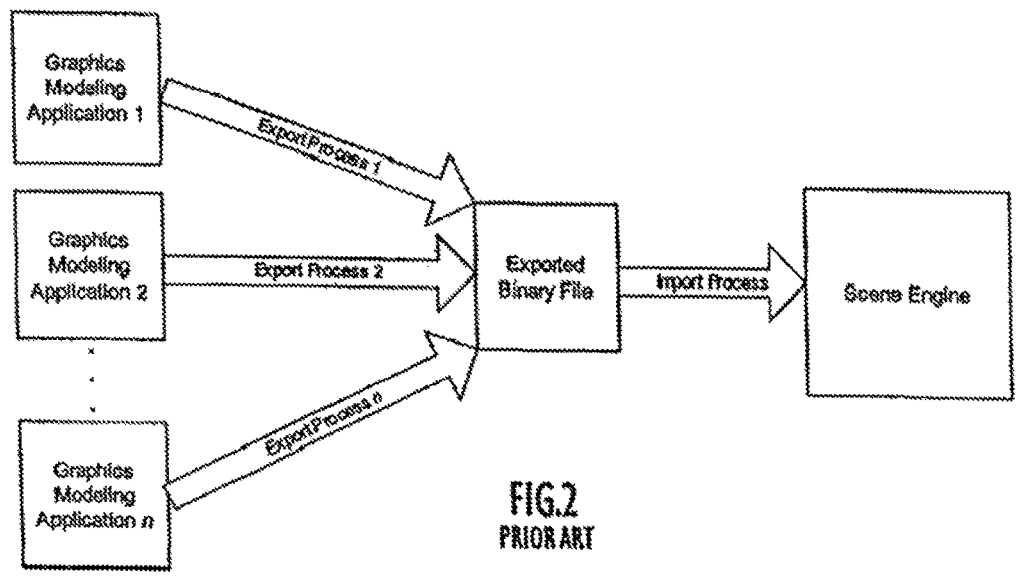
Figure 4:
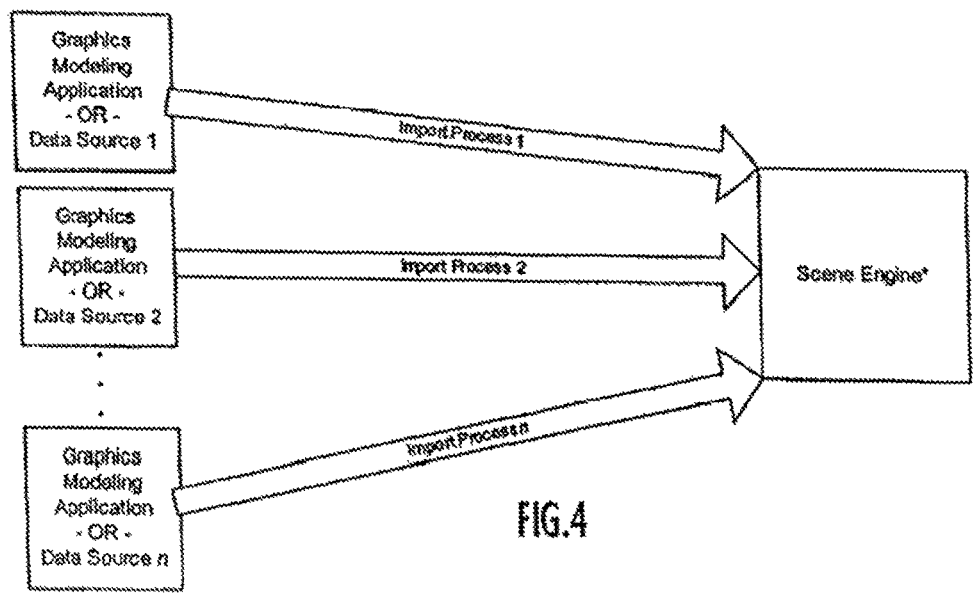
Figure 5:
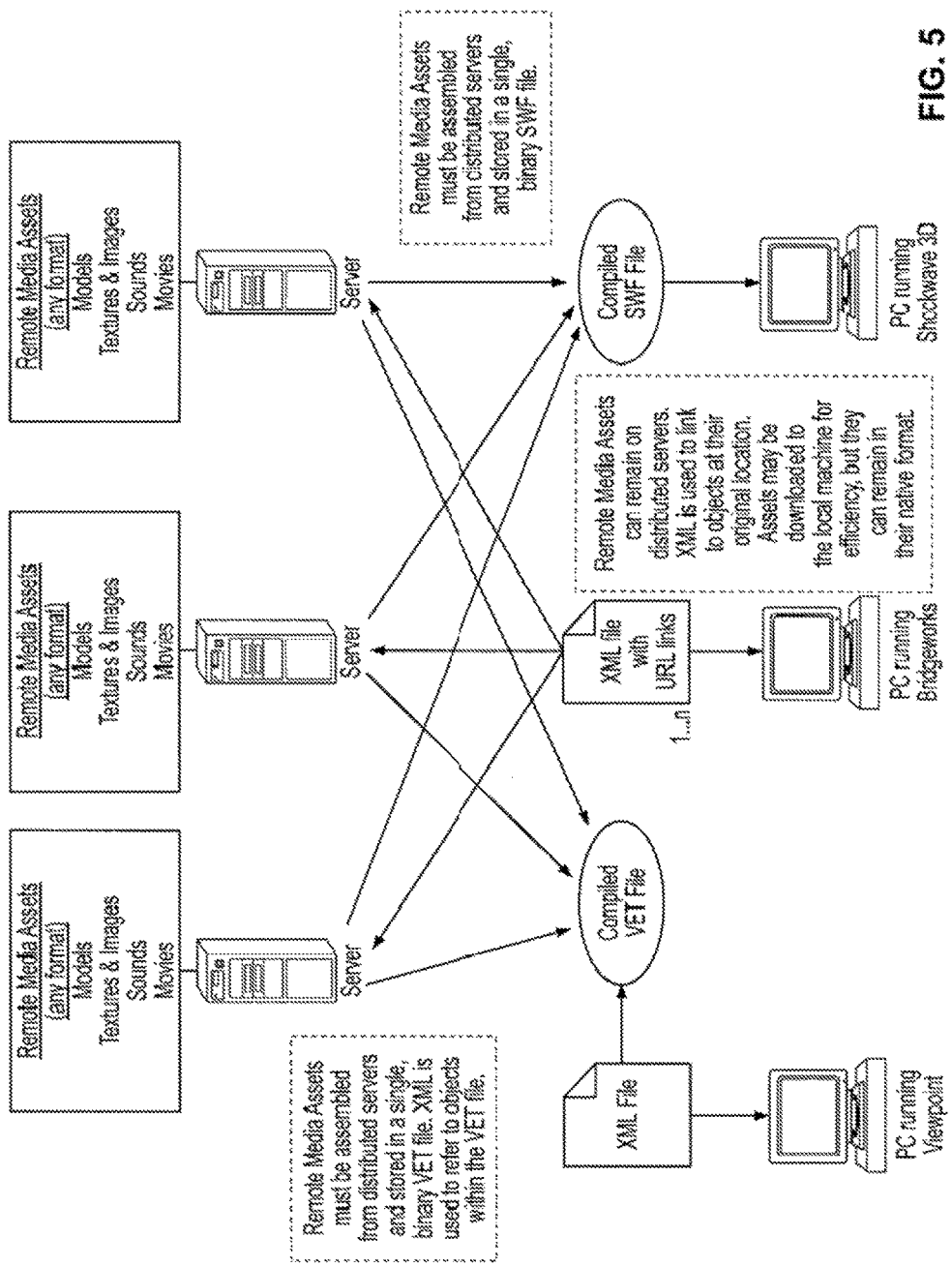
FIG. 5 is a diagram showing the present invention and the prior art technologies.

In accordance with the present invention, dynamic, interactive, two or more dimensional media can be authored, assembled and delivered without the need for pre-compiled content as shown in FIGS. 3 and 4 in comparison to FIGS. 1 and 2, respectively, and as shown in FIG. 5. As shown in FIGS. 3 and 4, the scene engine* operates in accordance with the method of the present invention such that there is no exported binary file as required in the prior art shown in FIGS. 1 and 2. The present invention supports the ability to provide content, interaction, and behavior without requiring a scene compiler and avoids the intermediate step of compiling or repackaging content.

FIG. 5 is a diagram that shows how the present invention is different from two other interactive 3D products with regard to using assets stored remotely on distributed servers. The present invention is labeled as "Bridgeworks" in FIG. 5. The two prior art products shown in the diagram, along with Bridgeworks, are Viewpoint and Shockwave 3D. Significant in the diagram are the directions of the arrows. The present invention parses an XML document (one or more) that points to the assets in their original locations and formats. Depending upon the objectives of a particular application, these assets might be downloaded into a local cache or they might be streamed directly to the 3D scene. On the other hand, both prior art products are precluded from this approach through their use of their proprietary binary content files. At some point in their processes, the original media content (and programmed behavior) must be re-packaged or re-compiled before it can be delivered to or requested by the client application. Assuming all products have the ability to "import" the same 3rd party, proprietary file formats (e.g., .lwo, .3DS, .dxf, .jpeg, .gif, etc.), that there exist three different assets stored at three different locations, and that each of the products wants to use all of these assets, in order for Shockwave and Viewpoint to do so, they must 1) download each of the assets to a shared location and 2) package or compile these assets into yet another proprietary binary format. The present invention, however, requires only that a link be created in an XML file that locates each asset in its original location and format. In effect, the present invention has the ability to create hyperlinks to 3D content just as if it were any other linkable asset.

The following is a working XML file under the present invention with links to remote assets that demonstrates what is shown in Bridgeworks section of FIG. 5 with the exceptions that servers and the model files are purely demonstrative and that the URL attribute for the KeyframeInterpolator is not used in exactly the way shown although it could be used simply. For exemplary purposes, the URL attribute is omitted and instead the data is pushed from the server in a process that is initiated through JavaScript. There are several means by which animation data can be accessed by or delivered to the scene. The following is one XML example where it is necessary to reference a data source within an XML stream. The key point is that the data for the animation, like all other assets, can be stored anywhere; and, furthermore, it does not need to be compiled into an intermediate binary file.

```
<?xml version="1.0" encoding="UTF-8"?>
<?bwplugin name="BBD3D8Engine" action="load"?>
<Scene name="Scene">
    <Isolator name="Root">
        <Group name="Cameras">
            <PerspectiveCamera name="Camera"
nearDistance=".25" farDistance="80000" zoom="3.2">
                <position x="-20000" y="3500" z="0"/>
                    <rotation x="10" y="90" z="0"/>
                </PerspectiveCamera>
        </Group>
        <Group name="Lights">
            <DirectionalLight name="DirLight"/>
        </Group>
        <Group name="Models">
            <!-- A 3D Model file located on Server1 -->
            <Model name="Some Terrain"
            url="\\Server1/objects/Terrain.lwo"/>
            <!-- A 3D Model file located on Server2 -->
            <Model name="Vehicle1"
            url="\\Server2/objects/Vehicle.lwo"/>
        </Group>
    </Isolator>
    <!-- 3D animation data stored in a remote database on Server3-->
    <KeyframeInterpolator name="Vehicle1 Travel Data"
target="Vehicle1" url="http://Server3/data/
VehicleDataServer.aspx\?Vehicle1&Jan03;"/>
    <!--Background image stored on the local machine -->
    <RenderDirective name="RenderDirective"
backgroundImageFilename="C:\Program
Files\Bridgeborn\Bridgeworks\Content\BW_A10\images\sky.jpg"/>
</ Scene>
```

Remote data sources and remote content are not exactly the same thing, even though they have been combined together in parts herein for purposes of simplifying understanding of the present invention. Remote content generally refers to 3D model files and image files, but remote content may also be any content that can be presented in the scene either visually or audibly. In other words, "remote content" usually means, "remote media file." Remote data, on the other hand, might be any kind of data that can be interpreted into something presentable. Some non-3D quantitative value may be used to determine the size of a model, for example (e.g., size of population used to determine height of terrain). The present invention treats remote data used to drive an interactive 3D scene just like any other asset used for the scene.

Figure 6:
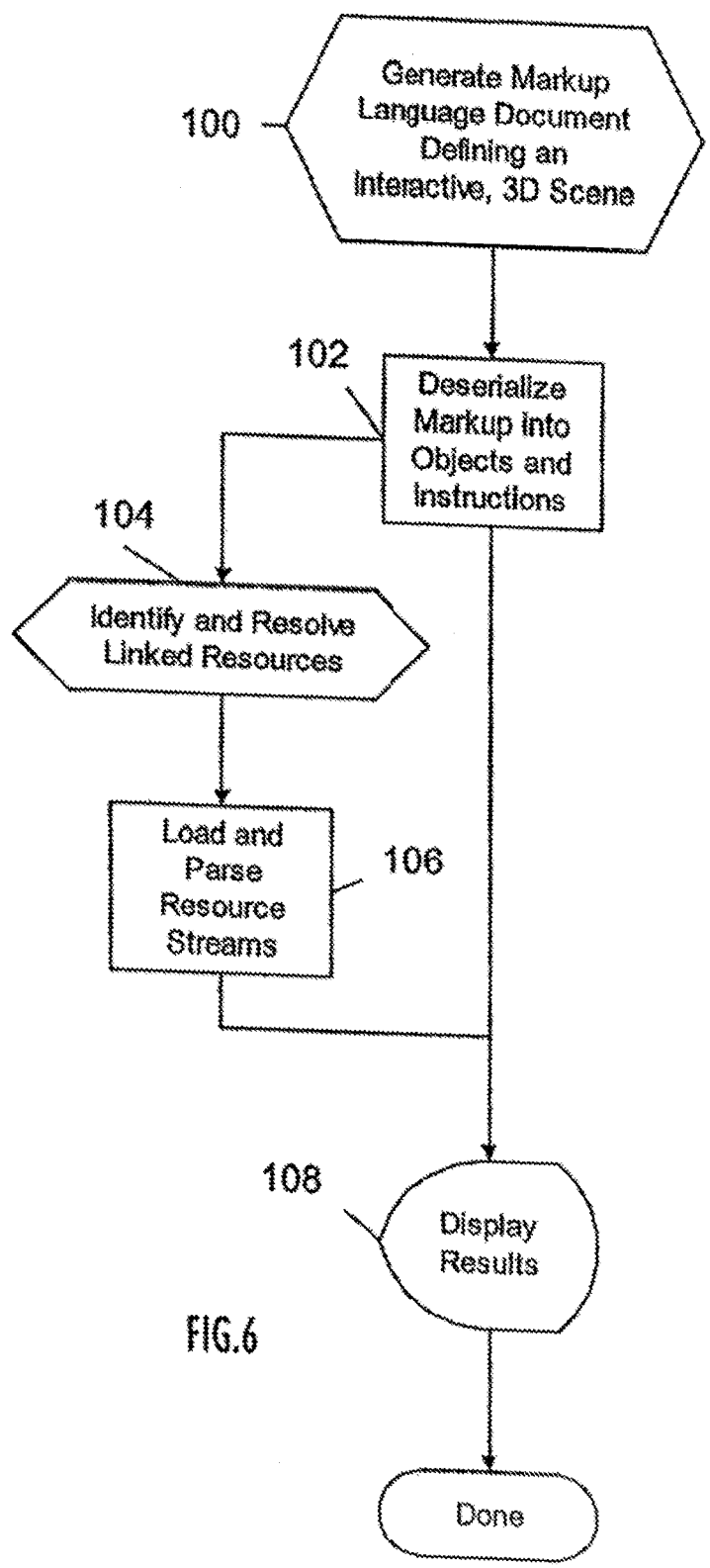
FIG. 6 is a flow chart showing the method according to the present invention.

FIG. 6 illustrates the method of the present invention to take an input document and create a 3D graphical display without pre-compiling a scene. The first step 100 in the method involves generating or obtaining, as input, a markup language document (such as one created in XML) defining an interactive 3D scene. The scene may have graphics, such as a scene graph with models, lights and textures. The scene may have interaction behavior such as the ability to rotate objects. The markup language can be created by any known method, including by simply typing in instructions into an XML file or by using a JavaScript. In the next step 102 in the method, the markup language document is parsed, specifically the markup language document is "deserialized" into objects and instructions. "Deserialization" as used herein means a process of taking what is in the markup language document, creating objects in memory and configuring their attributes. For objects or instructions that are defined completely in the markup language document, the method proceeds to step 108 in order to create a display of the results. Objects and instructions that are not completely defined in the markup language document can be referenced through URIs (links) found in the serialized document. In such cases, external files or data sources are accessed in order to process the object or instruction. The external files can be local to the system or can reside elsewhere and be accessible over the Internet or any communication network. Under the method of the present invention, step 104 is performed to identify and resolve the linked resources. The method would then, in step 106, load and parse the linked resource streams necessary to perform the object or instruction as if it were originally present in the markup language document. Examples of such resource streams include software specific formats needed in order to view or display graphical data. Thereafter, the results are ready for display. Step 108 shows the display of the results and refers not just to the actual display of graphics on a screen but also to the underlying commands being in place in order for the display to be shown on a screen.

Figure 7:
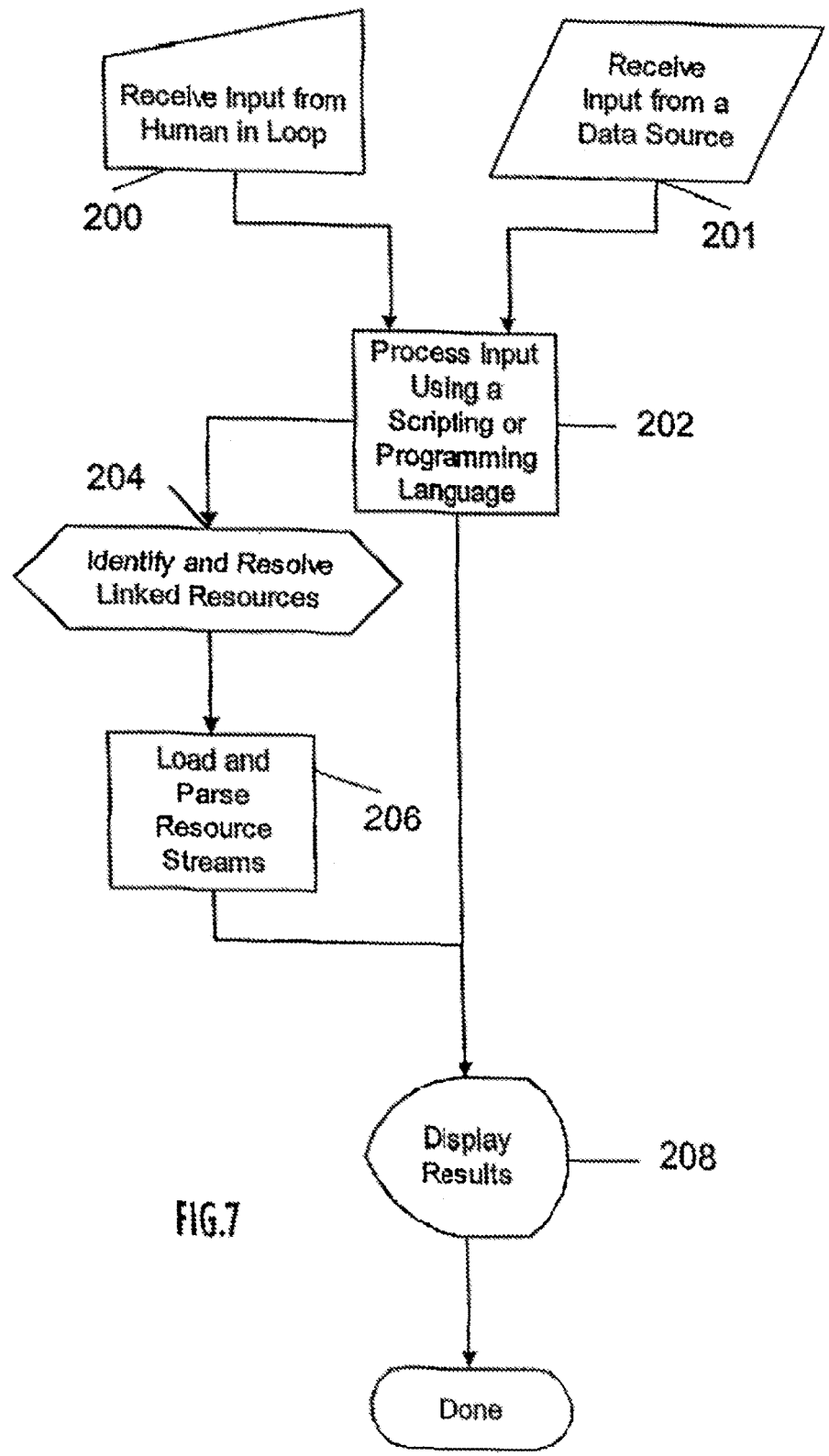
FIG. 7 is a flow chart showing an alternate method according to the present invention.

FIG. 7 is a flowchart illustrating the steps taken in another embodiment of the present invention to take input and create a 3D graphical display avoiding having to pre-compile scene content. The first step in the process is receiving input from either a human in the loop, shown as step 200, and/or a data source, shown as step 201. The scene may have graphics, such as a scene graph with models, lights and textures. The scene may have interaction behavior such as the ability to rotate objects. This input can be received by a JavaScript document or any other non-compiled scripting language or compiled software component, the contents of the scene not being re-compiled before they appear in the display. In the next step in the process, shown as step 202, input is processed to produce a markup language document. Specifically, input is used to create objects and instructions and for configuring their attributes. For objects or instructions that are defined completely in the markup language document (do not require external resources), the system proceeds to step 208 in order to create the display of the results. Objects and instructions that are not completely defined in the markup language document can be referenced through URIs (links) found in the input. In such cases, external files or data sources are to be accessed in order to process the object or instruction. The external files or data sources may be local to the system or may reside elsewhere and be accessible over the Internet or any communication network. Under the method of the present invention, the system would perform step 204 to identify and resolve the linked resources. The system would then, in step 206, load and parse the linked resource streams necessary to perform the object or instruction as if it were originally present in the markup language document. Examples of such resource streams include software specific formats needed in order to view or display graphical data. Thereafter, the results are ready for display. Step 208 shows the display of the results and refers not just to the actual display of graphics on a screen but also to the underlying commands being in place in order for the display to be shown on a screen, thus providing screen engine.

The present invention provides a method by which output from a database is transformed into input for the scene. For example, a database has a schema, or structure, defining field names and value types that do not directly correspond to any defined inputs for the scene. It may be the case that the field names and value types have different syntax, but the same semantics as certain scene inputs. In some cases, a "translation" may be required to transform the output of the database into input for a scene.

Figure 8:
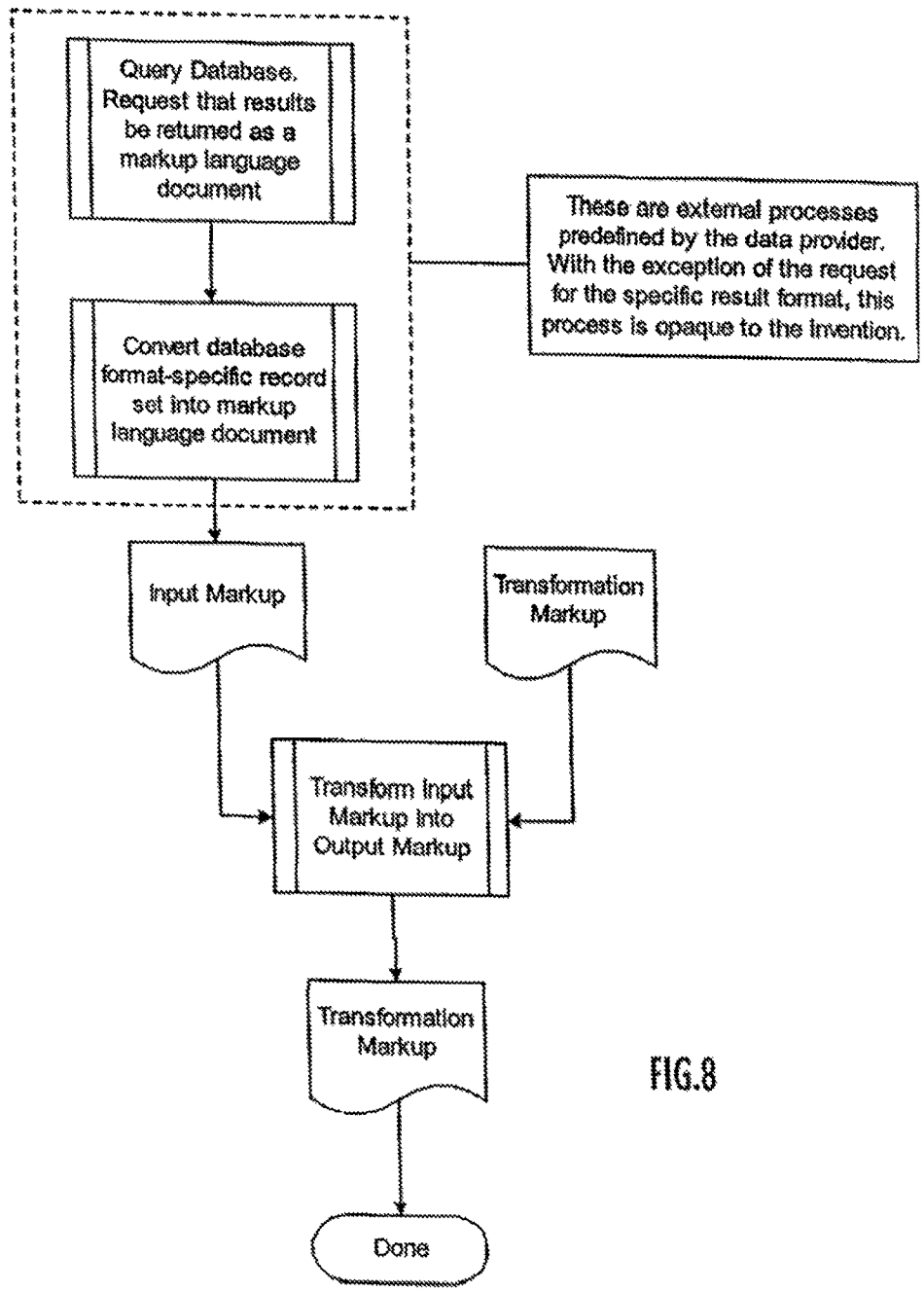
FIG. 8 is a flow chart showing a base case of the method according to the present invention.

The base case of this method by which output from a database is transformed into input for a scene is shown in FIG. 8 and involves a database record set, three markup language documents and a software executable component that interprets markup transformations. Initially, a database is queried and returns a record set as a first markup language document, usually through a process executed by the database server. External processes can be used by the method of the invention. That is, the process of returning a record set as a markup document (i.e., XML) is a service provided by many commonly deployed database server applications, such as the one used by the method. Likewise, the process of taking an input markup file and a transformation markup file and generating an output markup file is also found in many commonly deployed components, such as the one used by the present invention. This is referred to as "input markup." A second markup language document, the "transformation markup," is introduced. The transformation markup defines a process of converting the input markup into a third markup language document, the "output markup." A software component takes both the input markup and the transformation markup and uses them to create the output markup which is ready to be used as input for the scene.

The process is reversible and is accomplished without requiring any part of the scene's input to pass through a scene compiler before the input can be used to create a scene. The database may even store URLs to binary scene content, and these will be written as URLs in the output markup. It is possible to store the content directly in the database, not as a linked binary. In this case, the transformation refers to the database as the content source and the URL written in the output markup points to the database. When the URL is encountered, the invention processes by which remote content is "identified, resolved, loaded and parsed" are executed.

Figure 9:
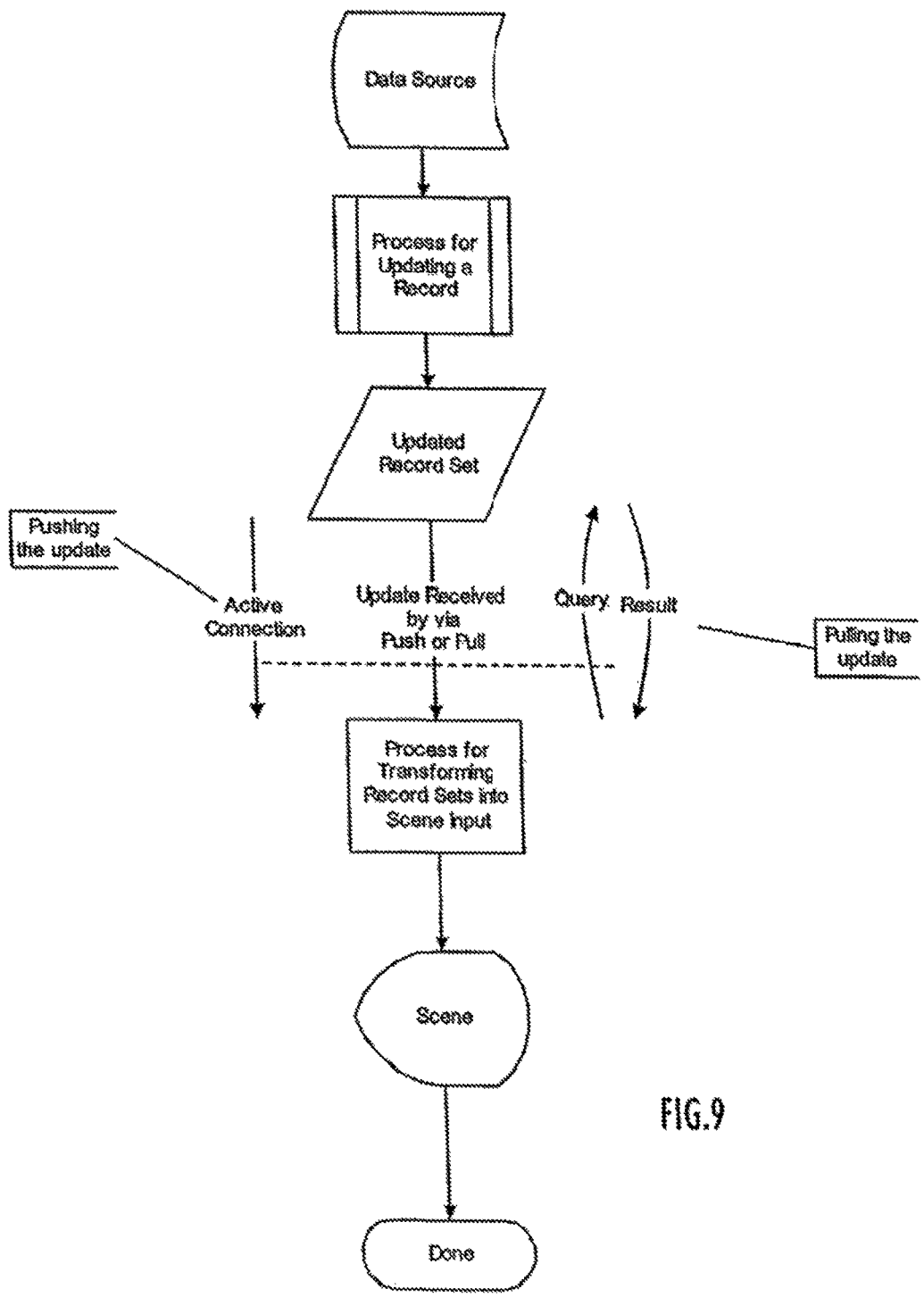
FIG. 9 is a flow chart showing a method for propagating database updates according to the present invention.

A method according to the present invention for propagating database updates to a scene is shown in FIG. 9 where a database user adds or modifies a record in a database. There is a 3D scene monitoring records in that same database and displaying the records' values in some way. When the data changes, the scene changes. The method may use the previously described record set transformation method, but it is not required. The value of one or more fields in a database is updated (by any means available). Depending on the objectives of a client application using the present invention, this update may be pushed from the database to the client application through an active connection or pulled by the client application through a normal query/result cycle. If either the field name and or the value type are not understood by any of the components that make up the present invention, then the previously described record set transformation method can be used. The record containing the update is processed through the invention as an update to a scene. For example, the size of an object can increase as data value increases. It is possible to do this entirely without the use of a markup language document. Instead this method could use a scripting language to "identify, resolve, load, and parse" interactive scene content.

Figure 10:
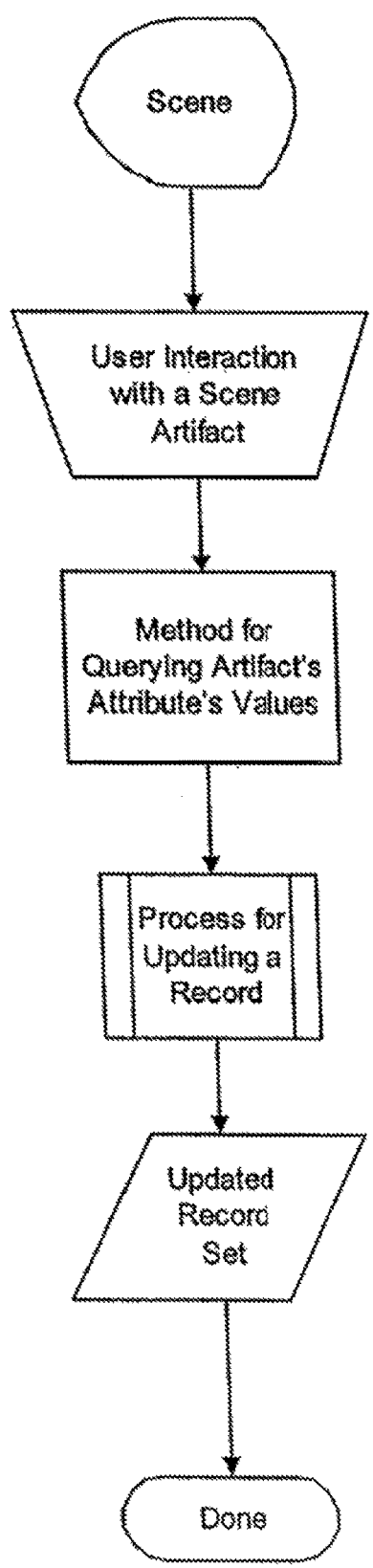
FIG. 10 is a flow chart showing a method for changing the content and seeing the result propagate according to the present invention.

A method according to the present invention for changing the content and seeing the results propagate to the data source(s) is shown in FIG. 10 wherein a user clicks on a 3D data column and "pushes" it down from the top so as to make it appear shorter. While this is happening, or after the interaction is completed, a value in a field within a database gets smaller. The user, through some physical or virtual implement, affects some attribute of an object in the scene. For example, using the mouse as a controller, the user clicks on a model and drags the mouse in order to affect the model's scale. The object does not necessarily represent visual graphics, though it can. The value of the attribute that is affected is reported in one of two ways, either the attribute value is broadcast as an event, like other events within the system or the attribute of the model is connected to one or more attributes of other components. When the model's attribute is set, the connected attributes receive the value. A software component receives the new attribute value. This component has the ability to update a database. The new attribute value is updated in the database. If either the attribute name and or its value type are not understood by the database, then the reverse of the previously described record set method is used.

With respect to the relationship between scene graphs and markup languages, the XML DOM ("document object model") is a hierarchically arranged data structure containing information related to some collection of computer-based media or content. Developers often think of an instance of the DOM as a "tree." Whether viewed in memory or as saved text in a file, the DOM has well-defined elements and a well-defined structure. There is a single root node. The root can have child nodes, creating a parent-child relationship. There are also sibling relationships. Nodes can be added, removed, and/or replaced. Assembling a collection of nodes hierarchically creates a tree. Branches of the tree can be traversed. These concepts are fundamental to graph-based data structures in general, of which a tree is a specific type, and every one of these concepts can be found in any good Scene Graph (SG) API.

A scene graph is a hierarchically arranged data structure containing information related to a collection of 3D scene content. This makes XML especially well suited for expressing, constructing, and modifying 3D scene graphs. Below is an example of an XML DOM from an actual scene under the present invention:

TABLE-US-00002

```
<Scene name="MyFirstScene">
    <Isolator name="MainRoot" isolateTransforms="true">
        <PerspectiveCamera name="Camera" zoom="3.2" nearDistance=".25" farDistance="4000">
            <position x="3" y="4.2424" z="-3"/>
            <rotation x="45" y="-45" z="0"/>
        </PerspectiveCamera>
        <GlobalIllumination name="GlobalLight">
            <ambient r=".5" g=".5" b=".5"/>
        </GlobalIllumination>
        <DirectionalLight name="TheLight">
            <ambient r="0.7" g="0.7" b="0.7"/>
            <diffuse r="1" g="1" b="1"/>
            <specular r="1" g="1" b="1"/>
            <rotation x="30" y="-25" z="0"/>
        </DirectionalLight>
        <Model name="Box" url="/objects/Box.lwo">
            <position x="0" y=".25" z="0"/>
            <rotation x="0" y="0" z="0"/>
            <scale x="1" y="1" z="1"/>
        </Model>
    </Isolator>
</Scene>
```

Figure 11:
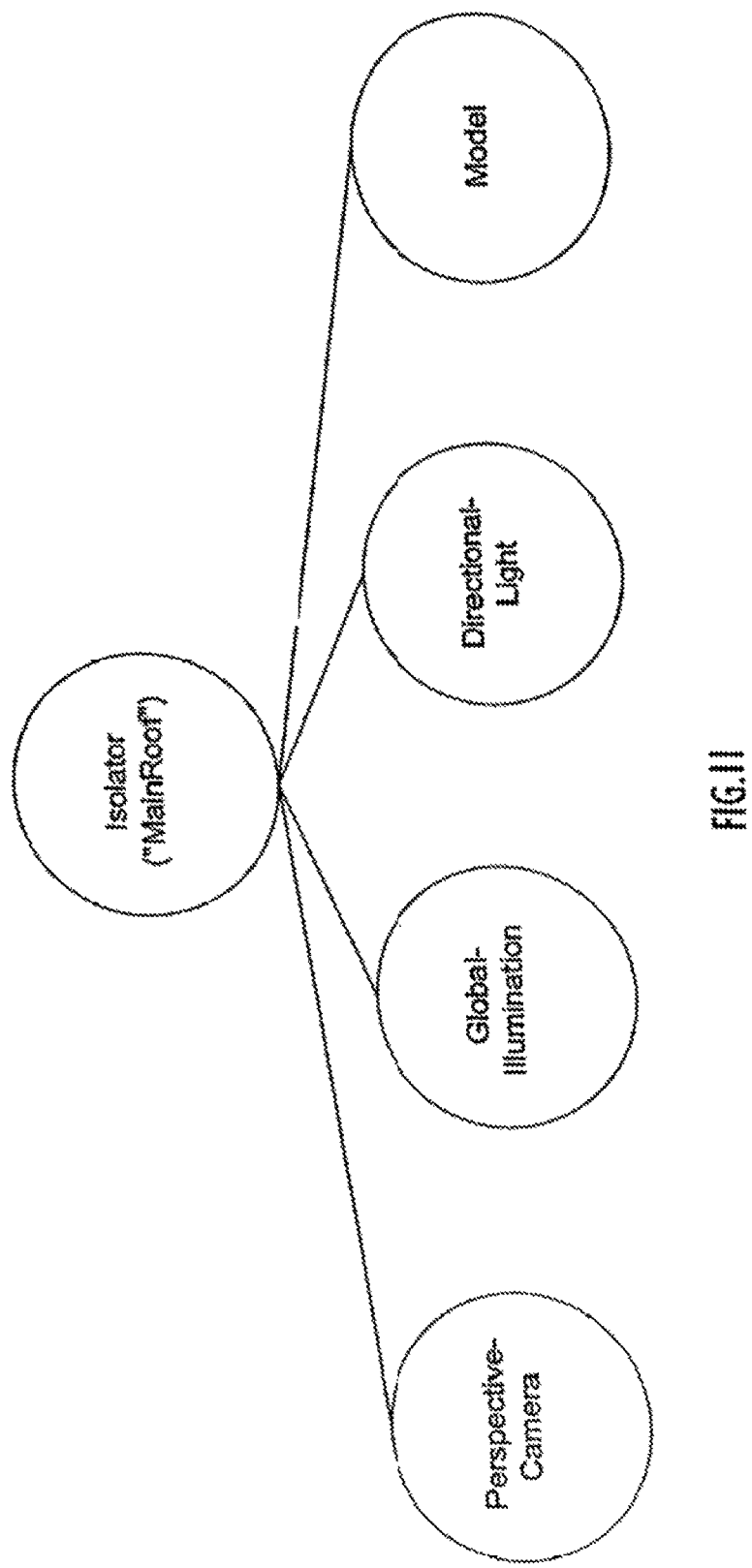
FIG. 11 is a scene graph diagram of an XML document in accordance with the present invention.

In the above XML document, Isolator, PerspectiveCamera, GlobalIllumination, DirectionalLight, and Model are all Nodes. They are Nodes both in the nomenclature of both the XML DOM and our scene graph API in the present invention. Other SceneGraph APIs might use different names to represent the same kind of node, but they use nodes nonetheless. FIG. 11 is the XML document shown as a scene graph diagram, it being noted that the actual scene graph is slightly more complicated. A model node is the root of a subtree of geometry, surface, and texture nodes.

As will be appreciated from the above, the use of a markup language to define behavior in accordance with the present invention helps eliminate the needs for both proprietary scripting languages and compiled script. Commands are objects that execute literal instructions: "Set" some properties of the model, "Play" an animation, "Remove" a model. These commands are classes that are defined by a schema, and expressed as XML. One reason XML is used is because it can be easily passed between heterogeneous systems (including people) and translated when those systems' data processing "languages" don't match. XML can be easily modified in practical situations where the often necessary, though equally lamentable, "quick fix" is required.

Prior art solutions rely on proprietary scripting languages to process the instructions that provide interactivity within an application (e.g., Director3D requires LINGO, Mayim has its own language). Scripting languages are embodied by traditional abstract programming interfaces (APIs) that provide the means for expressing programmable instructions. These scripting languages are usually compiled into closed applications. This creates many problems. The first problem with scripting languages is that they require both human users and computer-based clients have detailed knowledge of an API and, perhaps more importantly, have the ability to express instructions in the restricted manner required by these APIs. Consider the following example in Director3D's LINGO, which rotates a model 20 units about the Y axis:

x=0;
y=20;
z=0;
member("Orb").model(1).rotate(x,y,z);

How does a program express that it wants to execute this instruction? This instruction typically must be compiled into any application that needs to execute it. All that the application can do is anticipate that the instruction will be needed and perhaps expose the settable variables through some GUI. In order to issue a different instruction altogether, at runtime, programmed support must already exist at compile time. Even if the instruction is not compiled (e.g., it is written in JavaScript), a computer cannot automatically introduce a new instruction.

Comparing this paradigm with the present invention, it will be appreciated that instructions in the present invention are written in simple markup text and are not compiled. Here is the comparable instruction under the present invention for rotating the model:

```
<Set target="Orb">
    <rotation x="0" y="20" z="0"/>
</Set>
```

Changing the values of the rotation, or switching altogether to "translation", is as basic as changing the markup and sending the result stream to the present invention.

Commands can be sent directly into a scene for immediate execution, or they can be qualified to execute only when certain events occur. For example:

```
<CommandSequence event="Mbutton1.Click">
    <Set target="Orb">
        <rotation x="0" y="20" z="0"/>
    </Set>
</CommandSequence>
```

This says that the set command will only rotate the model when the mouse's left button is clicked.

State machines are one example of a primitive behavior that can be expressed in XML. The state machine concept builds upon the command concept. Specifically, state machines contain one or more states. States contain one or more command sequences. Command sequences can respond to 0 or more events. Multiple command sequences can respond to the same event. Separate states must be used to isolate commands that affect the same objects and/or attributes when triggered by the same event. Otherwise, the commands will conflict. The following is a simple example that turns a light on and off by changing states whenever the left mouse button is clicked:

```
<?xml version="1.0" encoding="UTF-8"?>
<!-- A StateMachine with 2 States. The intial state is set to
turn the light off when the left mouse button is clicked
(assuming light is on).-->
<StateMachine initialState="TurnLightOff">
    <State name="TurnLightOff">
        <CommandSequence event="MButton1.Click">
            <Set target="TheLight">
                <show>false</show>
            </Set>
            <!-- Light is OFF. Change states so the next
click turns the light on.-->
            <StateTransition goto="TurnLightOn"/>
        </CommandSequence>
    </State>
    <State name="TurnLightOn">
        <CommandSequence event="MButton1.Click">
            <Set target="TheLight">
                <show>true</show>
            </Set>
            <!-- Light is ON. Change states so the next
click turns the light off.-->
            <StateTransition goto="TurnLightOff"/>
        </CommandSequence>
    </State>
</StateMachine>
```

Because the state machine is expressed in XML, it need not be compiled. The behavior of the state machine can even be changed dynamically at runtime by changing, perhaps, the events to which it responds, the command sequences executed within a particular state, the objects affected by the commands, etc.

Inasmuch as the present invention is subject to many variations, modifications and changes in detail, it is intended that all subject matter discussed above or shown in the accompanying drawings be interpreted as illustrative only and not be taken in a limiting sense.

The invention claimed is:

1. A method comprising:
receiving a markup language document describing a three-dimensional scene;
deserializing the markup language document into objects and instructions;
identifying a linked resource in the objects and instructions;
identifying a native format and native location for the linked resource;
generating an intermediate representation of a portion of the linked resource based on the native format;
embedding the intermediate representation within the objects and instructions, the embedding replacing the portion of the linked resource present in the objects and instructions;
directly streaming the linked resource in the native format from the native location according to the intermediate representation; and
displaying the three-dimensional scene described in the objects and instructions, the three-dimensional scene including the linked resource.

2. The method of claim 1, wherein the linked resource is selected from a group consisting of remote data and remote content.

3. The method of claim 2, wherein the linked resource comprises a database record.

4. The method of claim 3, further comprising:
receiving an update to the linked resource; and
updating the display of the linked resource based on the update.

5. The method of claim 4, wherein updating the display of the linked resource based on the update comprises updating a property of the linked resource.

6. The method of claim 1, in which the linked resource is streamed to a local cache.

7. The method of claim 1, further comprising:
receiving a user interaction with the linked resource;
updating the display of the linked resource based on the user interaction; and
transmitting an update to a property of the linked resource to a server.

8. The method of claim 7, wherein an update to a property of the linked resource to a server causes an update to a database record associated with the linked resource.

9. The method of claim 1, wherein the markup language document comprises a scene graph.

10. The method of claim 9, wherein the linked resource comprises a three-dimensional model file.

11. A computer program product, tangibly embodied in a non-transitory computer-readable storage medium bearing instructions to cause one or more computers to:
receive a markup language document describing a three-dimensional scene;
deserialize the markup language document into objects and instructions:
identify a linked resource in the objects and instructions;
identify a native format and native location for the linked resource;
generate an intermediate representation of a portion of the linked resource based on the native format;
embed the intermediate representation within the m objects and instructions, the embedding replacing the portion of the linked resource present in the objects and instructions;
directly stream the linked resource in the native format from the native location according to the intermediate representation; and
display the three-dimensional scene described in the objects and instructions, the three-dimensional scene including the linked resource.

12. The computer program product of claim 11, wherein the linked resource is selected from a group consisting of remote data and remote content.

13. The computer program product of claim 12, wherein the linked resource comprises a database record.

14. The computer program product of claim 13, wherein the instructions cause the one or more computers to:
receive an update to the linked resource; and
update the display of the linked resource based on the update.

15. The computer program product of claim 14, wherein updating the display of the linked resource based on the update comprises updating a property of the linked resource.

16. The computer program product of claim 11, in which the instructions cause the one or more computers to stream the linked resource to a local cache.

17. The computer program product of claim 11, wherein the instructions cause the one or more computers to:
    receive a user interaction with the linked resource;
    update the display of the linked resource based on the user interaction; and
    transmit an update to a property of the linked resource to a server.

18. The computer program product of claim 17, wherein an update to a property of the linked resource to a server causes an update to a database record associated with the linked resource.

19. The computer program product of claim 11, wherein the markup language document comprises a scene graph.

20. The computer program product of claim 19, wherein linked resource comprises three-dimensional model file.

* * * * *